G. S. WITHAM, Jr.
INDICATING DEVICE FOR SELF PROPELLED VEHICLES.
APPLICATION FILED MAR. 25, 1916.
1,359,944. Patented Nov. 23, 1920.
2 SHEETS—SHEET 1.
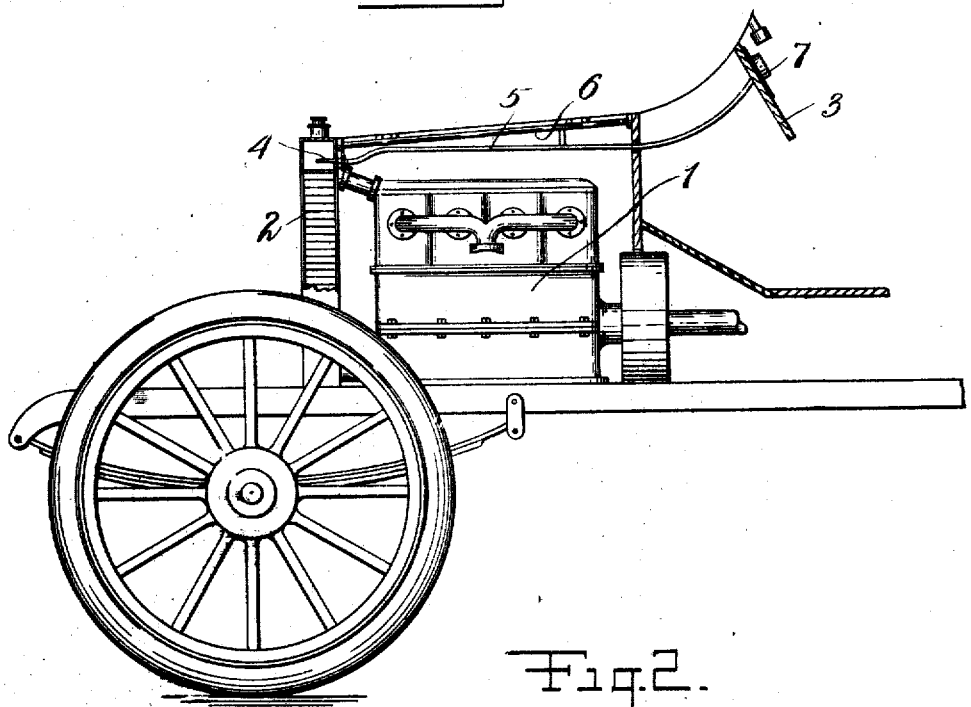
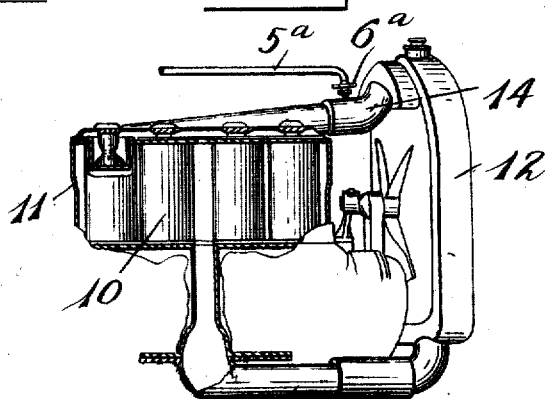
Inventor
GEORGE S. WITHAM, JR.
By His Attorneys.
Pennie, Davis & Marvin

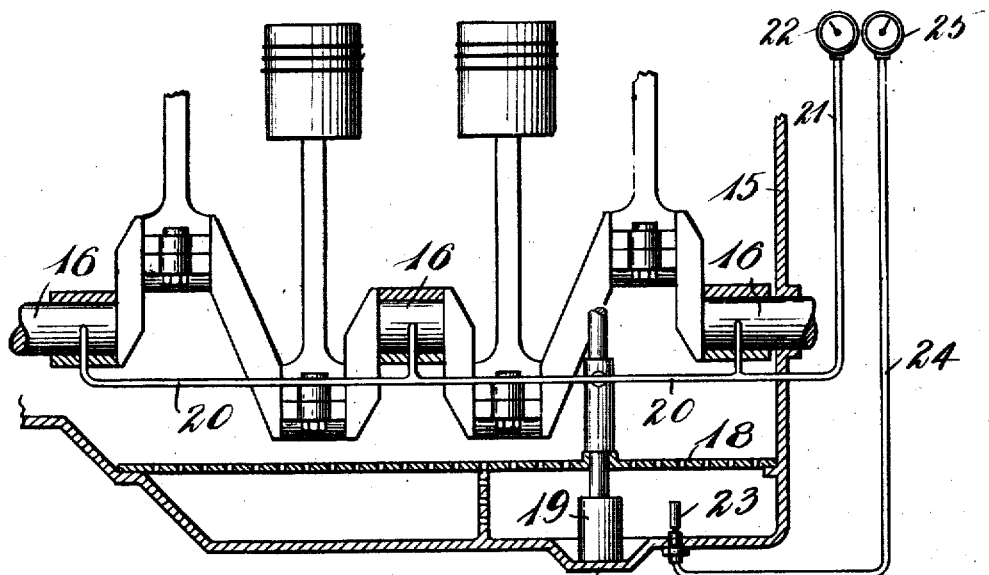
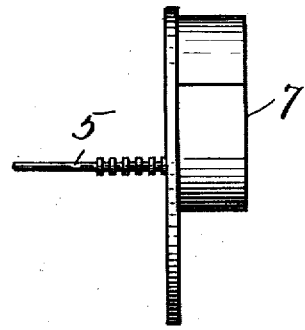
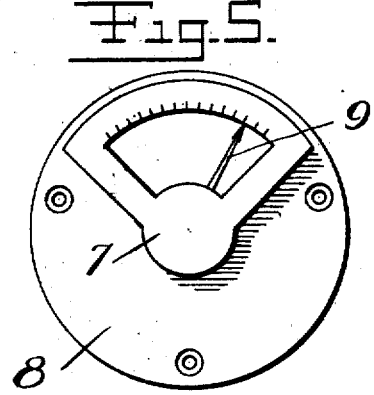
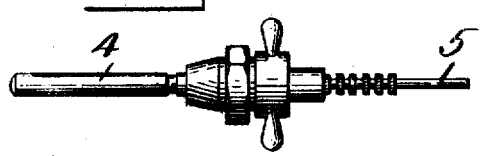

UNITED STATES PATENT OFFICE.

GEORGE S. WITHAM, JR., OF AU SABLE FORKS, NEW YORK.

INDICATING DEVICE FOR SELF-PROPELLED VEHICLES.

1,359,944.          Specification of Letters Patent.     Patented Nov. 23, 1920.

Application filed March 25, 1916. Serial No. 86,581.

*To all whom it may concern:*

Be it known that I, GEORGE S. WITHAM, Jr., a citizen of the United States, residing at Au Sable Forks, county of Essex, State of New York, have invented certain new and useful Improvements in Indicating Devices for Self-Propelled Vehicles; and I do hereby declare the following to be a full, clear, and exact description of the invention, such as will enable others skilled in the art to which it appertains to make and use the same.

This invention relates to a thermal indicating device or efficiency meter for automobiles, aeroplanes, motor boats, and like self-propelled vehicles; and it comprises such an indicating device constructed and arranged to indicate, upon the instrument board or dash board of the automobile or upon other accessible or convenient part of the vehicle, the thermal conditions of the internal combustion engine of such vehicles or of the oil or water circulatory systems thereof.

The present invention comprises a thermal indicating device with the heat-responsive element thereof arranged in heat-interchanging relation to the engine cylinders or to the oil or water circulatory systems therefor. This element may thus be arranged in the radiator which serves to cool the water of a water-cooled engine, or in the connections between the engine and the radiator, or in any other relation to the water circulatory system. In the case of an oil circulatory system, such as a lubricating system, the heat-responsive element may be arranged at any convenient part of the system, preferably where the oil is at its maximum temperature. Where the engine is air-cooled, instead of water-cooled, the heat responsive element may be arranged at any suitable part of the engine where it will be subjected to the heat of the cylinders or of the radiating elements therefor, so that it will be acted upon thereby.

In addition to the heat-responsive element, the invention comprises means such as a flexible capillary tube connecting the heat-responsive element to an indicating gage or thermometer arranged for convenient observation by the engine or vehicle operator. The indicating gage may be a pressure gage, and the connection between the gage and the heat-responsive element may be of a nature which will transfer the pressure of the heat-responsive element to the indicating gage. The heat-responsive element may thus be provided with a fluid or vapor of a nature such that its expansion under the influence of changes in temperature, will cause corresponding indications in the indicating gage, due to the expansion of the liquid or fluid or to the variations in pressure due to the variations in temperature. The indicating gage will thus indicate, in a continuous and automatic manner, the thermal condition of the element or elements which are in heat-interchanging relation with the heat-responsive element.

Inasmuch as this indication is thus continuous and automatic, it is adapted to be recorded by the provision of suitable recording devices of a nature which will afford a permanent record of variations in temperature over a considerable period of time.

The invention will be described more in detail in connection with the embodiments thereof illustrated in the accompanying drawings, but it is intended and understood that the invention will be illustrated by, but will not be limited to, the specific embodiments so illustrated and described.

In the accompanying drawings—

Figure 1 shows, partly in outline, and partly in section, parts of an automobile with the invention embodied therein.

Fig. 2 shows part of a modified construction embodying the invention.

Fig. 3 shows a still further modification.

Fig. 4 is an enlarged elevation of the indicating device of Fig. 1.

Fig. 5 is a front view of said indicating device.

Fig. 6 is an enlarged view of the heat-responsive element such as is shown in Figs. 1, 2 and 3.

In Fig. 1 an automobile engine is illustrated conventionally at 1, the engine being of the four-cylinder type, but it will be understood that the number of cylinders can be increased or decreased without departing from the general mode of operation. The radiator of the automobile is indicated at 2, and the dash board or instrument board at 3. These parts are shown conventionally, as are also certain other parts of the automobile. Part of the top of the radiator is broken away, and in the part thus exposed is shown the heat-responsive element 4, which contains a fluid or vapor of a nature adapted to cause variations in pressure corresponding to variations in temperature, and to transmit this pressure to a distant point. This heat-responsive element is connected by means of the capillary tube 5 to the indicating gage 7, suitably arranged upon the dash board or instrument board 3 where it can be readily seen by the operator, and preferably where it will be illuminated by the usual light carried upon the instrument board of an automobile. Where the heat-responsive element 4 is arranged in the radiator, the connecting tube 5 may conveniently be arranged above the cylinders and supported from the upper portion of the hood or the supporting member 6 therefor. This arrangement keeps the tube away from the operating parts of the engine and where it will not interfere with the examination and repair of the engine parts.

The element 4 may be above the water level in the radiator, but it may also be below the normal water level and continually subjected to the temperature of the circulating water so that it will indicate in a continuous and automatic manner the thermal condition of the water in the radiator, and so that this temperature will be indicated upon the instrument board or at other convenient point for observation without, however, bringing the circulating fluid to the point at which the indicating device is placed.

Where the heat-responsive element and its connecting tube and thermometer or indicating gage is used in connection with other vehicles than an automobile, it can be similarly arranged so that the heat-responsive element will be subjected to the influence of the circulating water or other fluid or of the engine itself, and the thermometer or indicating gage can be arranged at any convenient point for observation. In flying machines where the engine is arranged behind the operator it is impossible for him to observe the conditions of operation without turning around, so far as the condition of operation is indicated by devices carried by the engine itself. With the present invention, however, the heat-responsive element can be arranged at any suitable part of the engine, even where this part is inaccessible for purposes of continual observation, and the thermometer or indicating device can be brought to any desired point of observation in front of the operator.

Fig. 2 shows, conventionally, parts of a water-cooled engine in which all of the cylinders are inclosed within a single water jacket. This engine is of a type in which sleeve valves are used, and in which accordingly the usual cam operated valves are not provided at the head of the cylinders. These cylinders are indicated at 10 and are surrounded by an outer casing 11 forming the outer casing of the water jacket. The water is circulated from the radiator 12 to the jacket through the pipe 13 and returned to the radiator through the pipe 14. The heat-responsive element 6$^a$ is in this case arranged in the pipe 14 through which the hot water from the water jacket passes to the radiator. It thus indicates a temperature which is substantially the maximum temperature of the circulatory system, and this indication is transferred to the thermometer or gage located upon the dash board of the automobile or at other convenient point of observation.

In Fig. 3 parts of the casing of an engine are indicated at 15, the crank being indicated at 16 supported in suitable bearings. The casing 15 at its bottom has a well or depression 17 in which a pump 19 is arranged for circulating the lubricating oil to the crank shaft or to other point of distribution or use.

A perforated bottom 18 is arranged above the bottom of the casing 15 and serves as a filter for the oil. From the pump 19, which is operated by any suitable part of the engine, a distributing pipe 20 feeds the oil to the crank shaft or other point of use and this pipe is provided with an extension 21 leading to a pressure gage 22 arranged upon the dash board or instrument board or other convenient point of observation.

The elements thus far described in connection with Fig. 3 are of any suitable or preferred construction and operation, as will be readily understood by those skilled in the art.

The gage 22 serves to indicate the pressure on the discharge side of the pump and accordingly serves to indicate whether the pump and the lubricating system are operating properly. Failure of the oil supply and of the circulation by means of the pump will be indicated to the operator by the indication given by this pressure gage. Accordingly, when the gage indicates the proper pressure, the operator knows that the engine contains a sufficient amount of oil and that it is being circulated properly.

There are very many abnormal conditions within the lubricating system, or sufficiently related thereto as to be indicated thereby, which are not indicated by the pressure gage 22. These conditions are particularly thermal conditions due to abnormal increase in temperature. A low grade of oil, an insufficient amount of oil, low water in the radiator with resulting over-heating thereof, and over-heating of other parts of the engine, hot bearings, dirty spark plugs, and over-working of the engine, are some of the abnormal conditions which result in over-heating of the oil and thereby indicate their existence.

According to the present invention, as illustrated in Fig. 3, means is provided for indicating in an automatic and continuous manner the thermal condition of the oil, and this indication is made without circulation of the oil up to the dash board. To this end a heat-responsive element 23, similar to the element 4 of Fig. 1, is arranged where it is subjected to the thermal conditions of the oil, and is connected by the capillary tube or connection 24 to the thermometer or indicating or recording gage 25 arranged upon the dash board or instrument board or at other convenient place of observation. This gage 25 enables the operator to tell at a glance whether the oil has been over-heated or whether it is of normal temperature. The gage 22 shows the operator whether the lubricating pump is operating properly with the necessary amount of oil. The combination of the two indications gives to the operator a complete and automatic indication which enables him to tell whether the oil is being properly circulated in proper amount and whether the temperature of this oil is high or low, high temperatures indicating abnormal conditions which require investigation. It is important that both the circulation of the oil and its temperature should be indicated for the reason that either indication alone would not indicate all of the conditions which are necessary to be present for satisfactory operation. Without the thermal indicator, the oil might be highly over-heated without warning of a nature which the operator would heed. Without the indicator of the oil circulation, the thermal indicator might indicate the temperature of the casing when no oil is present. The two indicating devices co-act to give a complete indication such as cannot be obtained with either device alone. This combined indication is furthermore obtained without circulating oil up to the dash board to register its temperature at that point; and, with equal advantage, this indication is obtained without circulating the oil up to the dash board and through a visible sight feed.

Figs. 4, 5 and 6 are enlarged views of the indicating gage 7 and of the heat-responsive element 4. The gage 7 may be of any suitable construction and is shown as provided with a flange 8 by means of which it is attached to the instrument board, and with a pointer 9 coöperating with a suitable calibrated thermal scale.

Where the indicating gage, or the indicating gages, such as those of Fig. 3, are all segregated away from the engine and upon the dash board, they may be conveniently arranged under the instrument light where they can be illuminated at night and their indications continuously observed.

The capillary or other connecting tube 5 may be of a flexible nature so that it can be readily attached and supported.

It is becoming more and more common, in automobile construction, to omit the filling cap and filling opening at the top of a radiator, and, in such cases, it is not feasible to provide a temperature indicating device at such point, where it will be visible to the operator. The device of the present invention, as indicated for example in Fig. 1, is not affected by the presence of the filling opening or cap at the top of the radiator, and such opening can be provided within the hood or at any other suitable point without interfering with the operation of the heat-responsive element and its coöperating indicating or recording gage.

I claim:—

In a self-propelled vehicle driven by an internal combustion engine provided with a pump for supplying lubricant to the bearings of the engine, and a well in communication with the intake side of the pump for collecting the oil after it has passed through the bearings, the combination of a conduit leading from the discharge side of the pump, a pressure indicating device connected to the conduit and mounted on a part of the vehicle in position to be conveniently observed by the driver, a heat responsive element mounted in the well, a capillary tube leading from the heat responsive element, and an indicating device connected to the capillary tube and mounted adjacent to the first named indicating device.

In testimony whereof I affix my signature.

GEORGE S. WITHAM, Jr.